US 6,560,078 B1

(12) United States Patent
Pinarbasi

(10) Patent No.: US 6,560,078 B1
(45) Date of Patent: May 6, 2003

(54) BILAYER SEED LAYER FOR SPIN VALVES

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 09/615,359

(22) Filed: Jul. 13, 2000

(51) Int. Cl.[7] .................................................. G11B 5/39
(52) U.S. Cl. ................................................. 360/324.11
(58) Field of Search ......................... 360/324.11, 324.1; 324/207.21; 338/32 R

(56) References Cited

U.S. PATENT DOCUMENTS

| | | |
|---|---|---|
| 5,287,238 A | 2/1994 | Baumgart et al. |
| 5,422,571 A | 6/1995 | Gurney et al. |
| 5,432,734 A | 7/1995 | Kawano et al. |
| 5,696,656 A | 12/1997 | Gill et al. |
| 5,738,946 A | 4/1998 | Iwasaki et al. |
| 5,764,056 A | 6/1998 | Mao et al. |
| 5,768,071 A | 6/1998 | Lin |
| 5,774,394 A | 6/1998 | Chen et al. |
| 5,784,225 A | 7/1998 | Saito et al. |
| 5,828,529 A | 10/1998 | Gill |
| 5,850,323 A | 12/1998 | Kanai |
| 5,862,021 A | 1/1999 | Deguchi et al. |
| 5,866,212 A | 2/1999 | Kurosawa et al. |
| 5,869,963 A | 2/1999 | Saito et al. |
| 5,871,622 A | 2/1999 | Pinarbasi |
| 5,872,502 A | 2/1999 | Fujikata et al. |
| 5,903,415 A | 5/1999 | Gill |
| 5,920,446 A | 7/1999 | Gill |
| 5,993,566 A | 11/1999 | Lin |
| 6,052,262 A | 4/2000 | Kamiguchi et al. |
| 6,208,492 B1 | 3/2001 | Pinarbasi |
| 6,278,592 B1 * | 8/2001 | Xue et al. ............... 360/324.11 |
| 6,306,266 B1 * | 10/2001 | Metin et al. ........... 204/192.11 |

FOREIGN PATENT DOCUMENTS

| | | |
|---|---|---|
| JP | 409083039 A | 3/1997 |
| JP | 410154618 A | 6/1998 |
| JP | 410289421 A | 10/1998 |

OTHER PUBLICATIONS

A. Tanaka, Y. Shimizu, H. Kishi, K. Nagasaka and M. Oshiki, Dual Spin–Valve With Pd–Pt–Mn Anti–Ferromagnetic Layer, IEEE Transactions on Magnetics, vol. 33, No. 5, Sep. 1997.

Yasuyoshi Miyamoto, Tohru Yoshitani, Shigeki Nakagawa, Masahiko Naoe, Effects Of $Ni_{81}FE_{19}$ Underlayer and Ar Ion Bombardment to Deposition of (111) Oriented $Fe_{50}Mn_{50}$ Layers for Spin Valve Devices, IEEE, Transactions on Magnetics, vol. 32, No. 5, Sep. 1996.

* cited by examiner

Primary Examiner—George J. Letscher
(74) Attorney, Agent, or Firm—Blakely, Sokoloff, Taylor & Zafman

(57) ABSTRACT

An apparatus is described comprising a seed layer between a gap layer and an Iridium Manganese (IrMn) antiferromagnetic layer. The seed layer comprises an oxide layer next to a magnetic layer.

20 Claims, 5 Drawing Sheets

| 101 CAP | 102 SEED | 103 AFM | 109 PINNED | 119 SPACER | 105 FREE |

| 201 CAP | 202 SEED | 203 AFM | 221 MP2 | 223 | 222 MP1 | 204 SPACER | 205 FREE |

BILAYER SEED LAYER FOR SPIN VALVES

FIELD OF THE INVENTION

The field of invention relates to MR head technology generally; and more specifically, to seed layer structures that may be used to form a high sensitivity MR head.

BACKGROUND

Hardware systems often include memory storage devices having media on which data can be written to and read from. A direct access storage device (DASD or disk drive) incorporating rotating magnetic disks are commonly used for storing data in magnetic form. Magnetic heads, when writing data, record concentric, radially spaced information tracks on the rotating disks.

Magnetic heads also typically include read sensors that read data from the tracks on the disk surfaces. In high capacity disk drives, magnetoresistive (MR) read sensors, the defining structure of MR heads, can read stored data at higher linear densities than thin film heads. An MR head detects the magnetic field(s) through the change in resistance of its MR sensor. The resistance of the MR sensor changes as a function of the direction of the magnetic flux that emanates from the rotating disk.

One type of MR sensor, referred to as a giant magnetoresistive (GMR) effect sensor, takes advantage of the GMR effect. In GMR sensors, the resistance of the MR sensor varies with direction of flux from the rotating disk and as a function of the spin dependent transmission of conducting electrons between magnetic layers separated by a non-magnetic layer (commonly referred to as a spacer) and the accompanying spin dependent scattering within the magnetic layers that takes place at the interface of the magnetic and non-magnetic layers.

GMR sensors using two layers of magnetic material separated by a layer of GMR promoting non-magnetic material are generally referred to as spin valve (SV) sensors. In an SV sensor, one of the magnetic layers, referred to as the pinned layer, has its magnetization direction "pinned" via the influence of exchange coupling with an antiferromagnetic layer. Due to the relatively high internal anisotropy field associated with the pinned layer, the magnetization direction of the pinned layer typically does not rotate from the flux lines that emanate/terminate from/to the rotating disk. The magnetization direction of the other magnetic layer (commonly referred to as a free layer), however, is free to rotate with respect to the flux lines that emanate/terminate from/upon the rotating disk.

"Bottom" spin valves are spin valves having an antiferromagnetic layer formed prior to the formation of free layer. FIG. 1 shows a prior art SV sensor 100 comprising a seed layer 102 formed upon a gap layer 101. The sensor 100 of FIG. 1 is formed, layer by layer in the +x direction. Over seed layer 102 is an antiferromagnetic (AFM) layer 103. The seed layer 102 helps properly form the microstructure of the antiferromagnetic (AFM) layer 103. The AFM layer 103 is used to pin the magnetization direction of the pinned layer 104. Pinned layer 104 is separated from free layer 105 by the non magnetic, GMR promoting, spacer layer 119. Note that free magnetic layer 105 may be a multilayer structure having two or more ferromagnetic layers.

FIG. 2 shows another prior art "bottom" SV sensor structure 200 where the pinned layer is implemented as a structure 220 having two ferromagnetic films 221, 222 (also referred to as MP2 and MP1 layers, respectively) separated by a non ferromagnetic film 223 (such as ruthenium Ru) that provides antiparallel coupling of the two ferromagnetic films 221, 222. Sensor structures such as that 200 shown in FIG. 2 are referred to as AP sensors in light of the antiparallel magnetic relationship between films 221, 222. Similarly, structure 220 may also be referred to as an AP layer 220.

FIG. 2 shows an AP sensor 200 comprising a seed layer 202 formed upon a gap layer 201. Over seed layer 202 is an antiferromagnetic (AFM) layer 203. The seed layer 202 helps properly form the microstructure of AFM layer 203. The antiferromagnetic (AFM) 203 layer used to pin the magnetization direction of the MP2 layer 221. MP1 layer 222 is separated from free layer 205 by spacer layer 204. Note that free layer 205 may be a multilayer structure having two or more ferromagnetic layers.

Problems with forming the bottom sensors 100, 200 shown in FIGS. 1 and 2 include forming a seed layer 102, 202 with a microstructure that suitably influences the microstructure of the AFM layer 103, 203.

SUMMARY OF INVENTION

An apparatus is described comprising a seed layer between a gap layer and an Iridium Manganese (IrMn) antiferromagnetic layer. The seed layer comprises an oxide layer next to a magnetic layer.

BRIEF DESCRIPTION OF THE DRAWINGS

The present invention is illustrated by way of example, and not limitation, in the Figures of the accompanying drawings in which.

DETAILED DESCRIPTION

Figure 1:
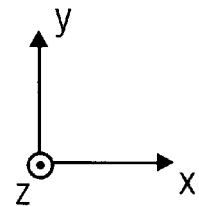
FIG. 1 shows a simple spin valve sensor.

An apparatus is described comprising a seed layer between a gap layer and an Iridium Manganese (IrMn) antiferromagnetic layer. The seed layer comprises an oxide layer next to a magnetic layer. Embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense.

Sensor 100, 200 designs are impacted as disk storage systems continue to increase the density at which they store bits of information. As disks are configured to store increasing amounts of information, the strength of the magnetic fields that emanate/terminate from/to the disk surface become weaker. In order to detect these weaker fields, sensors 100, 200 should be designed with enhanced sensitivity at smaller dimensions. Enhanced sensitivity at a smaller dimension may be achieved by keeping the exchange coupling field Hua between the pinned layer/MP2 104, 221 and the AFM layer 103, 203 high (e.g., 300 Oe or higher).

If the exchange coupling field Hua between the pinned/ MP2 layer 104, 221 and the AFM layer 103, 203 is too small, the magnetization direction of the free layer 105, 205 and pinned/MP1 layer 104, 222 may not be adequately perpendicular resulting in reduced sensor output signal swing. Reduced output signal swing from the sensor 100, 200 corresponds to reduced sensor sensitivity and is therefore undesirable.

Achieving a sufficiently large exchange coupling field Hua may be accomplished by controlling the microstructure of the AFM layer 103, 203. Specifically, for an iridium manganese (IrMn) AFM layer, large exchange coupling field Hua is produced by forming the AFM layer with a mostly (i.e., greater than 50%) face-centered-cubic (fcc) phase.

Figure 2:
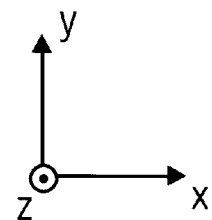
FIG. 2 shows an AP spin valve sensor.
Figure 3:
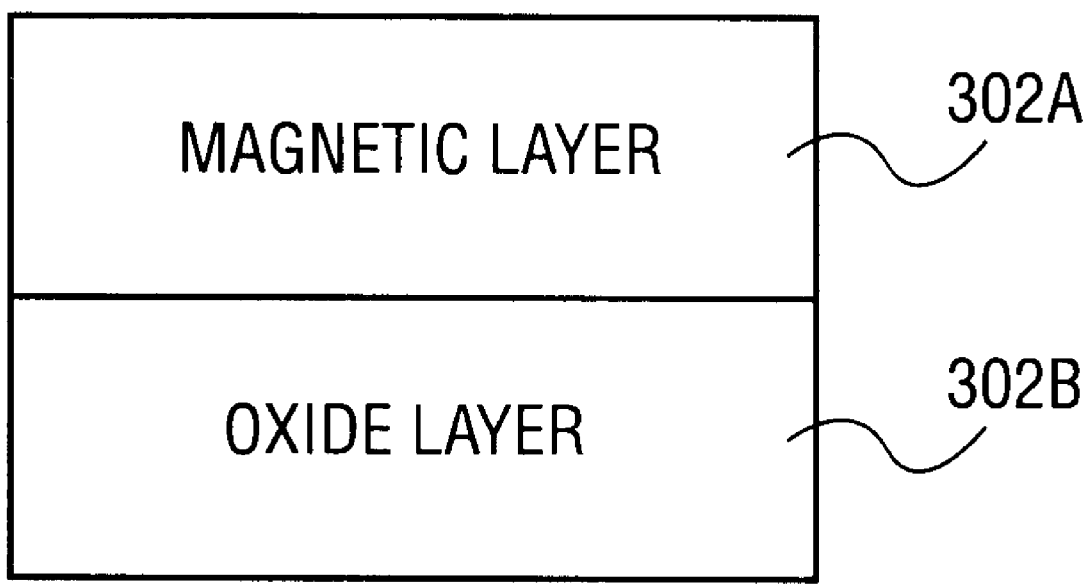
FIG. 3 shows a seed layer structure.

It has been found that bilayer seed layers, formed with certain materials, promote an fcc phase in an IrMn AFM layer within bottom type sensors such as those seen in FIGS. 1 and 2. The seed layer 302 shown in FIG. 3 is a bilayer structure.

Bilayer structures have two layers, a bottom layer and a top layer. In the bilayer seed structure 302 of FIG. 3, a magnetic layer 302a is the top layer and an oxide layer 302b is the bottom layer. The magnetic layer 302a is a layer made of ferromagnetic material such as Cobalt Iron (CoFe) or Nickel Iron (NiFe) or alloys thereof. The bottom layer is metallic oxide such as Nickel Oxide (NiO), Nickel Manganese Oxide (NiMnO), $NiO_x$ (where x is not 1.0) or NiFeCrO.

It is believed that the oxide layer 302b has an appropriate microstructure which helps the AFM layer form into a mostly fcc phase. The magnetic layer 302a isolates the AFM layer from the oxide during an anneal so that the IrMn does not oxidize. The anneal temperature may also be used to set the magnetization orientation of the pinned/MP2 104, 221 layers.

In one sensor embodiment that corresponds to a simple sensor structure (note that the structure 100 shown in FIG. 1 may be referred to as a simple sensor), the bilayer seed layer 302 has 40 Å of NiMnO as the oxide layer 302b formed upon an $Al_2O_3$ sensor gap 101. The magnetic layer 302a is a 10 Å layer of CoFe formed upon the oxide layer 302b. The remainder of the MR sensor (through the free layer) is: 1) an AFM 103 layer that is an 80 Å layer of IrMn formed upon the seed layer; 2) a pinned layer 104 that is a 24 Å layer of CoFe formed upon the AFM layer; 3) a spacer layer 119 that is a 22 Å layer of Copper (Cu) formed upon the pinned layer; and 4) a bilayered free layer 105 formed upon the spacer layer that comprises a 15 Å layer of CoFe and a 45 Å layer of NiFe.

Figure 4:
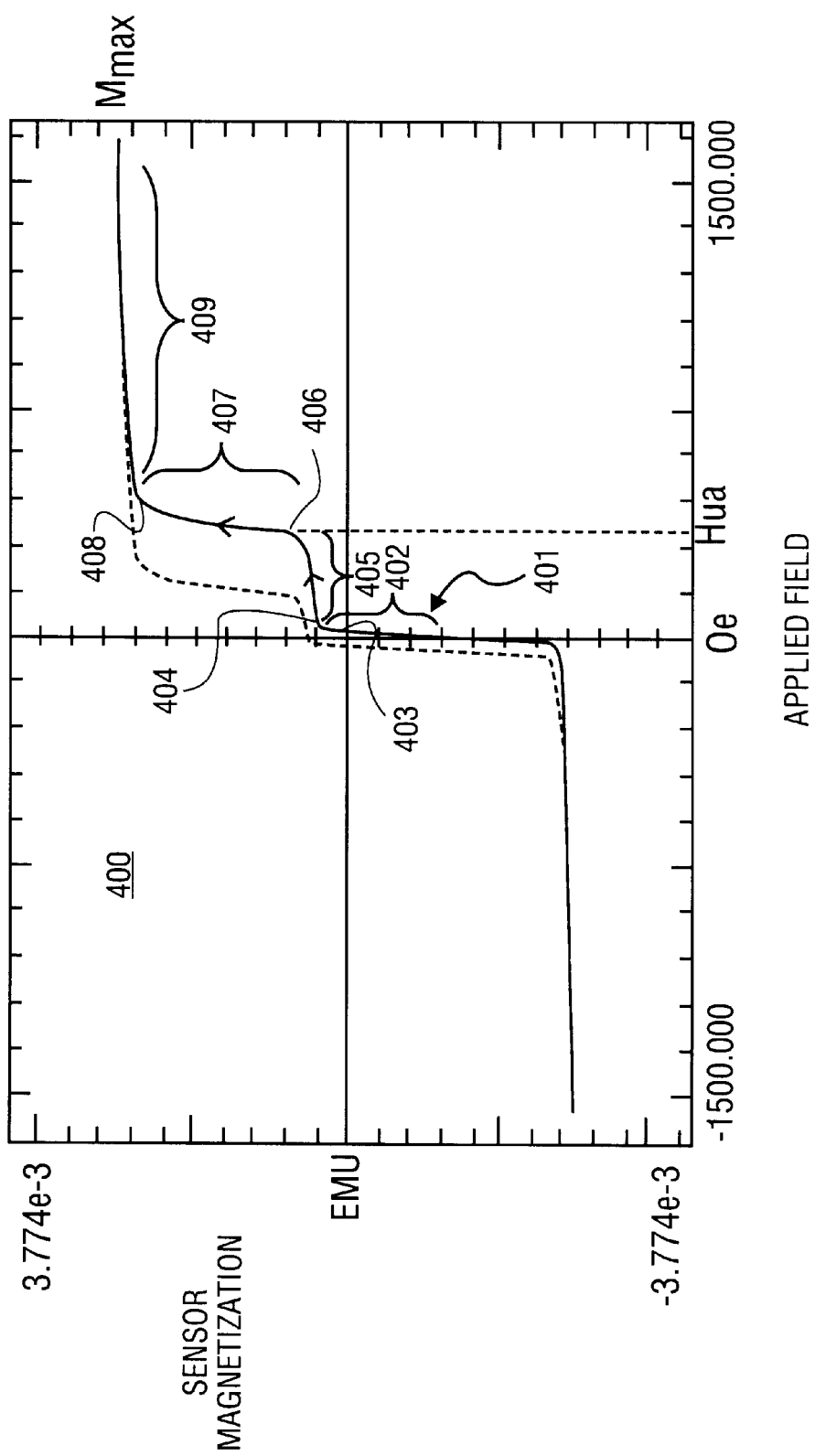
FIG. 4 shows a hysteresis curve for a sensor.

FIG. 4 shows the hysteresis curve 400 for the MR sensor described above. A hysteresis curve may be used to measure the strength of the antiferromagnetic coupling field Hua between the AFM layer 103 and the pinned layer 104. Referring to FIG. 1, in a typical simple sensor design, for a magnetic disk that lies in the xz plane, the magnetization direction of the free layer points (when unaffected by flux emanating/terminating from/to the disk) in the + or − z direction (i.e., points into the drawing or out of the drawing).

The magnetization direction of the pinned layer 104 is pinned perpendicular to the magnetization direction of the free layer 105 and, as such, points in the +y or −y direction. The direction of the pinned layer 104 magnetization is "pinned" by the exchange coupling field Hua that is exerted by the AFM layer 103. When the magnetization of the completed structure is measured (in the +z direction) as a function of an external field that is applied alternatively in the + and −z directions, a hysteresis curve such as the curve 400 shown in FIG. 4 is generated.

Referring to the hysteresis curve 400 of FIG. 4, initially (with no applied field) the hysteresis curve is at point 401. Point 401 indicates that with no applied field, the magnetic moment of the structure is negative (i.e., is pointed in the −z direction). The magnetic moment at this point 401 corresponds to the moment of the free layer 105. Here, the structure is configured so that the free layer points in the −z direction without any external bias. Position 401 represents the operational design point for the sensor when it is used in a disk drive.

As the external field is applied in the +z direction, the hysteresis curve 400 is traced out according to the arrows indicated in FIG. 4. In Region 402 the free layer, under the influence of the increasing intensity of the positive applied field, rotates away from its initial −z direction and eventually points in a +z direction. Within this region 402, the free layer reaches a position 403 where it points directly in the +y (or −y) direction and therefore exhibits no moment in the z direction (i.e., its moment is 0.0 emu as seen on the hysteresis curve).

As the applied field continues to increase in the +z direction from position 403, the free layer magnetization begins to point in the +z direction resulting in positive magnetization as seen in the hysteresis curve. Eventually the free layer "saturates" as to the fullest extent to which its magnetization can be rotated in the +z direction. The free layer saturation is reached at point 404.

Since the free layer is saturated at point 404, continued increase in the strength of the applied field has no further effect on the magnetization of the sensor. Thus region 405 shows no change in sensor magnetization as the external field is increased. Recall that during the tracing out of the hysteresis curve from position 401 through region 405, the magnetization direction of both the pinned layer 104 and the AFM layer 103 is along the y axis (referring briefly back to FIG. 1).

As such, these layers do not contribute to the magnetization of the sensor as observed on the hysteresis curve 400 (i.e., they do not possess a moment in the z direction). The fact that the magnetization of the pinned layer 104 stays pinned along the y axis as the applied field increases its intensity along the z axis is indicative of the strength of the exchange coupling field Hua exerted upon the pinned layer 104 by the AFM layer 103.

Eventually the applied field reaches an intensity level where it strips the pinned layer 104 away from the grasp of the exchange coupling field Hua. This occurs at position 406 on the curve 400. After the external field reaches an intensity level approximately equal to Hua, the pinned layer rotates in the +z direction to line up with the applied field. This rotation occurs over region 407 on the hysteresis curve 400.

When the magnetization of the pinned layer is saturated in the +z direction, the magnetization of the sensor no longer increases because all of its moments are extended in the +z direction to the fullest extent possible. The AFM layer has no net magnetization since it is antiferromagnetic. Thus, after the pinned layer saturation position 408 is reached, the hysteresis curve remains constant at a maximum magnetization value Mmax over region 409.

As discussed above, the strength of the exchange coupling field is indicated in the value of Hua. Recall from the introductory discussion of this section that the sensitivity of the sensor correlates to the strength of Hua. With other parameters being equal, a sensor having a high Hua tends to exhibit higher sensitivity than a sensor having a low Hua.

Referring briefly back to FIG. 3, experiments have shown that magnetic layers of approximately 10 Å of CoFe work well. An expected workable range for the magnetic layer is about 5.0–30.0 Å. Experiments have also shown that the if the magnetic layer becomes too thick (e.g., above 35.0 Å), Hua begins to fall below 300 Oe. Similar results have been obtained for a NiO oxide layer within the seed layer. Similar results are expected for a NiFe magnetic layer 302a within the seed layer and/or NiOx or NiFeCrO oxide layers 302b within the seed layer.

In another embodiment, a bottom AP sensor (according to the sensor structure 200 seen in FIG. 2), was formed where the bilayer seed layer 302 has 40 Å of NiMnO as the oxide layer 302b formed upon an $Al_2O_3$ sensor gap 101. The magnetic layer 302a is a 10 Å layer of CoFe formed upon the oxide layer 302b. The remainder of the MR sensor includes: 1) an AFM layer 203 that is an 80 Å layer of IrMn formed upon the seed layer; 2) an MP2 layer 221 that is a 27 Å layer of CoFe formed upon the AFM layer; 3) a non magnetic layer 223 that is an 8 Å layer of Ru formed upon the MP2 layer; 4) an MP1 layer 222 that is a 24 Å layer of CoFe formed upon the Ru layer; 5) a spacer layer 204 that is a 22 Å layer of Copper (Cu) formed upon the MP1 layer; and 6) a bilayered free layer 205 formed upon the spacer layer that comprises a 15 Å layer of CoFe and a 45 Å layer of NiFe. The hysteresis curve was similar exhibiting an Hua of approximately 1000 Oe.

Figure 5:
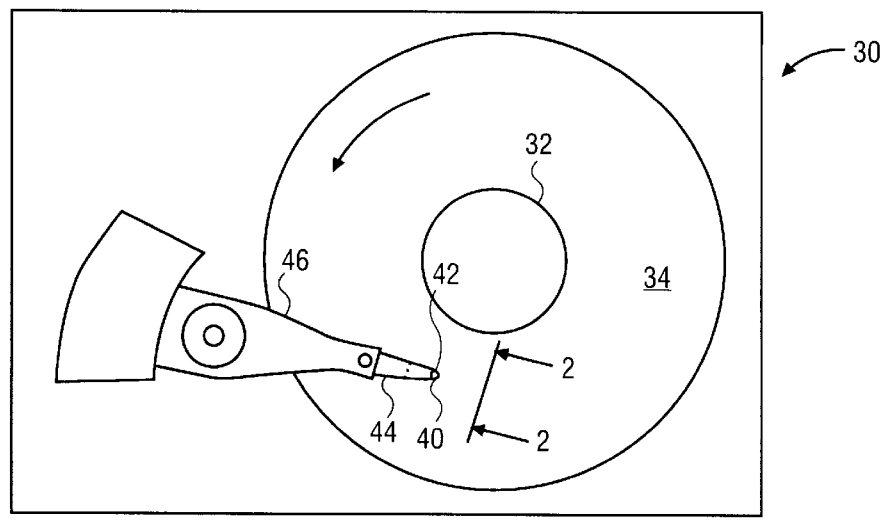
FIG. 5 shows a magnetic disk and activator.
Figure 6:
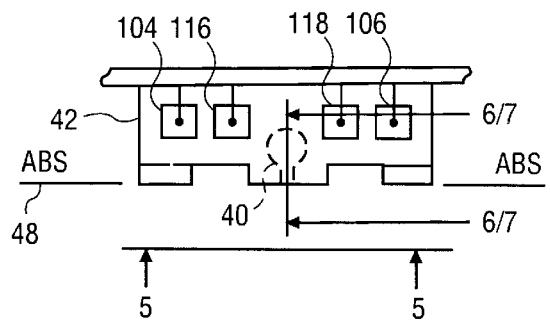
FIG. 6 shows an air bearing surface.
Figure 7:
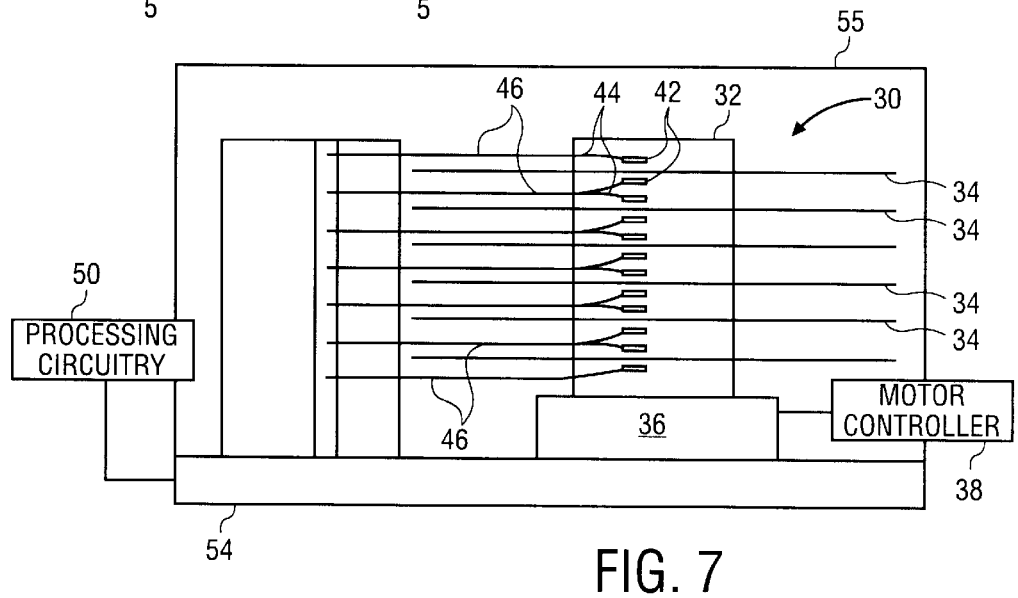
FIG. 7 shows a direct access storage device.

Referring now to the drawings wherein like reference numerals designate like or similar parts throughout the several views, FIGS. 5–7 illustrate a magnetic disk drive 30. The drive 30 includes a spindle 32 that supports and rotates a magnetic disk 34. The spindle 32 is rotated by a motor 36 that is controlled by a motor controller 38. A slider 42 with a combined read and write magnetic head 40 is supported by a suspension 44 and actuator arm 46. A plurality of disks, sliders and suspensions may be employed in a large capacity direct access storage device (DASD) as shown in FIG. 7. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks.

What is claimed is:

1. An apparatus, comprising:
a seed layer between a gap layer and an Iridium Manganese (IrMn) antiferromagnetic layer, said seed layer comprising an oxide layer next to a magnetic layer.

2. The apparatus of claim 1 wherein said magnetic layer is CoFe.

3. The apparatus of claim 1 wherein said magnetic layer is NiFe.

4. The apparatus of claim 1 wherein said oxide layer is NiO.

5. The apparatus of claim 1 wherein said oxide layer is NiMnO.

6. The apparatus of claim 1 wherein said oxide layer is $NiO_x$ where x is not 1.0.

7. The apparatus of claim 1 wherein said oxide layer is NiFeCrO.

8. The apparatus of claim 1 wherein said antiferromagnetic layer is next to said magnetic layer.

9. The apparatus of claim 8 wherein a pinned layer is next to said antiferromagnetic layer.

10. The apparatus of claim 8 wherein an MP2 layer is next to said antiferromagnetic layer.

11. An apparatus, comprising:
a) a disk; and
b) a head configured to be disposed over said disk, said head comprising, a multilayer structure having a seed layer between a gap layer and an Iridium Manganese (IrMn) antiferromagnetic layer, said seed layer comprising an oxide layer next to a magnetic layer.

12. The apparatus of claim 11 wherein said magnetic layer is CoFe.

13. The apparatus of claim 11 wherein said magnetic layer is NiFe.

14. The apparatus of claim 11 wherein said oxide layer is NiO.

15. The apparatus of claim 11 wherein said oxide layer is NiMnO.

16. The apparatus of claim 11 wherein said oxide layer is $NiO_x$ where x is not 1.0.

17. The apparatus of claim 11 wherein said oxide layer is NiFeCrO.

18. The apparatus of claim 11 wherein said antiferromagnetic layer is next to said magnetic layer.

19. The apparatus of claim 18 wherein a pinned layer is next to said antiferromagnetic layer.

20. The apparatus of claim 18 wherein an MP2 layer is next to said antiferromagnetic layer.

* * * * *